United States Patent
Sardenberg (10) Patent No.: US 12,366,052 B2
(45) Date of Patent: Jul. 22, 2025

(54) IDENTIFYING TELEMETRY DATA USING ARTIFICIAL INTELLIGENCE

(71) Applicant: Caterpillar Inc., Peoria, IL (US)

(72) Inventor: Lucas Inoue Sardenberg, Oak Park, IL (US)

(73) Assignee: Caterpillar Inc., Peoria, IL (US)

(*) Notice: Subject to any disclaimer, the term of this patent is extended or adjusted under 35 U.S.C. 154(b) by 302 days.

(21) Appl. No.: 17/949,245

(22) Filed: Sep. 21, 2022

(65) Prior Publication Data
US 2024/0093465 A1 Mar. 21, 2024

(51) Int. Cl.
*E02F 9/20* (2006.01)
*G06N 3/049* (2023.01)

(52) U.S. Cl.
CPC ........... *E02F 9/2054* (2013.01); *G06N 3/049* (2013.01)

(58) Field of Classification Search
CPC .............................. E02F 9/2054; G06N 3/049
See application file for complete search history.

(56) References Cited

U.S. PATENT DOCUMENTS

| | | |
|---|---|---|
| 2019/0162551 A1 | 5/2019 | Kean |
| 2020/0160723 A1* | 5/2020 | Switkes ............... G05D 1/0027 |
| 2021/0280073 A1 | 9/2021 | Pucciarella |
| 2021/0377719 A1 | 12/2021 | Du et al. |
| 2022/0164722 A1* | 5/2022 | Sadeghianpourhamami ............... G06Q 10/047 |
| 2022/0197306 A1* | 6/2022 | Cella ...................... G06N 3/088 |

FOREIGN PATENT DOCUMENTS

| | | |
|---|---|---|
| CN | 107545457 A | 1/2018 |
| CN | 110263458 B | 12/2020 |

OTHER PUBLICATIONS

Written Opinion and International Search Report for Int'l. Patent Appln. No. PCT/US2023/073135, mailed Oct. 25, 2023 (11 pgs).
"VisionLink Unified Fleet", Available Online At: https://www.myvisionlink.com, 2022, 11 pages.

* cited by examiner

*Primary Examiner* — James M McPherson
*Assistant Examiner* — Clint Pham (57) ABSTRACT

Vast knowledge of construction machinery is brought to bear in the design and construction of an artificial intelligence machine that accepts telemetry data of uncertain origin and, through a set of decisions executed within the machine, and produces candidate telemetry channel identification data at its output. Candidate telemetry channel identification data may be considered sufficiently accurate when a confidence measure generated by the artificial intelligence machine meets a confidence threshold condition. Otherwise, the candidate telemetry channel identification data is returned to the artificial intelligence machine in which hypotheses are generated as to the identities of the received telemetry data.

20 Claims, 5 Drawing Sheets

IDENTIFYING TELEMETRY DATA USING ARTIFICIAL INTELLIGENCE

TECHNICAL FIELD

The present disclosure generally relates to artificial intelligence applied in the practical application of identification of telemetry data from uncertain origin and, more specifically to the practical application of identification of construction machine telemetry data of uncertain origin using machine learning.

BACKGROUND

Heavy construction equipment, as well with other complex machinery, constitute a substantial financial investment for organizations requiring such machinery. Accordingly, maintenance programs, both preventative and corrective, are essential to the success of those organizations. Advancements made in the areas of sensor and telecommunication technologies, among others, have greatly contributed to easing various cumbersome activities associated with fleet maintenance management. Nevertheless, complications can arise, such as when similarly outfitted machines are differently configured, as is the case when machines are acquired by an organization from different manufacturers.

US Patent Application Publication 2021/0280073 is one example of centralized management of vehicle (unmanned aerial systems, or UASs) fleets. This system implements methods of predictive analytics that combine both human and machine inputs, such as from vehicle peripherals, sensors, and other hardware, into a database that allow for compartmentalization, weighting and other machine learning techniques for generating fleet management updates that inform decisions and processes. Methods of identifying the source of the data, i.e., human vs. machine, are enabled in addition to processing the data itself.

VisionLink, a fleet management product of VirtualSite Solutions, LLC, and described at the VisionLink website is one example of a platform that allows heavy construction equipment of different brands to be managed through a unified interface. The system utilizes telematic capabilities built into the heavy machinery and the management platform to obtain data that is indicative of the state of the different machines.

The foregoing examples operate under the notion that telemetry data are readily identifiable and analysis of the telemetry data is not necessary, much less by artificial intelligence, to identify available telemetry data, i.e., data of which the particular machine is capable of producing, that may be unidentified at least to the extent of the fleet management system's ability to recognize such. Complicating this issue is the preference of various heavy equipment manufacturers to keep telemetry identifying information internally private. Incorporating equipment of varied manufacturing origin into a unified management platform is a focus of fleet management research and development, as are techniques that ameliorate the impact of unidentified telemetry data on fleet management and other functions.

SUMMARY

In one aspect of the present general inventive concept, an apparatus identifies telemetry data generated from measurements made by sensors installed on machines of different species. Input circuitry accepts telemetry data of uncertain origin from among the sensors and output circuitry provides an identification of the telemetry data accepted at the input circuitry. Memory circuitry stores constraint information including weighting data and decision criteria. Processing circuitry retrieves the constraint information from the memory circuitry and configures therewith an artificial neural network (ANN) that is executed thereby, the ANN deriving the identification of the telemetry data through processor-executable decisions that are based on the decision criteria, decision results of the respective decisions are modified by the weight data.

In another aspect of the general inventive concept, a process is provided that identifies a set of telemetry data series generated from respective measurements made at a member construction machine of a fleet of construction machines and for which telemetry channel identifications (IDs) are indiscernible. Values are assigned to weight data based on known telemetry data identified by respective known telemetry channel IDs for other construction machines of like species as the member construction machine. An ANN is configured with the weight data on the edges thereof that are applied to decision results of processor-executable decisions performed at nodes thereof. The configured ANN is executed on the set of telemetry data series to generate thereby candidate telemetry channel IDs for one or more telemetry data series in the set of telemetry data series. Confidence measures are computed that are indicative of a likelihood that the respective generated candidate telemetry channel IDs correctly identify the respective telemetry data series in the set of telemetry data series. The computed confidence measures are compared with a confidence threshold and, if the computed confidence measures meet the confidence threshold, the candidate telemetry channel IDs are provided as the telemetry channel IDs of the telemetry data series.

In yet another aspect of the present general inventive concept, a computer-implemented fleet management system for managing a diverse fleet of construction machines is provided that identifies telemetry data generated from measurements made by sensors installed on the construction machines for which telemetry channel identifications (IDs) are indiscernible. An AI processor configures an artificial neural network (ANN) with processor-adaptable weights on edges thereof that are applied to decision results of processor-executable decisions performed at nodes thereof. The AI processor further trains the ANN to assign values to the weights based on known telemetry data as identified by respective known telemetry channel IDs in a native ontology. Additionally, the AI processor executes the trained ANN on the a set of telemetry data series assembled from the construction machine telemetry data received from a member construction machine of the fleet of construction machines to generate thereby one or more candidate telemetry channel IDs for the respective telemetry data series. The AI processor additionally computes a confidence measure indicative of a likelihood that the candidate telemetry channel IDs correctly identify the telemetry data series. A threshold comparator compares the computed confidence measure with a confidence threshold and, if the computed confidence measure meets the confidence threshold, the candidate telemetry channel IDs are provided as the telemetry channel IDs of the telemetry data arriving from the member construction machine. A telematics processor retrieves the telemetry channel IDs from the fleet database and performs fleet management operations for the fleet of construction machines based thereon.

DETAILED DESCRIPTION

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments.

The techniques described herein are generally directed to telemetry identification of data from uncertain sources via artificial intelligence (AI). Upon review of this disclosure and appreciation of the concepts disclosed herein, the ordinarily skilled artisan will recognize other data recognition contexts in which the present inventive concept can be applied. The scope of the present invention is intended to encompass all such alternative implementations.

For purposes of this application, the term "telematics" is meant to refer to information technology implementing techniques for the transmission of computerized information whereas the term "telemetry" or "telemetry data" is meant to refer to the computerized information transmitted. This distinction is not intended to assign alternative meanings to conventional definitions of these terms, but to aide in the description of the invention and in defining its boundaries in the presence of terms that are commonly used interchangeably.

Additionally, the terms "sensor ID," "channel ID," "telemetry (or sensor) source," and the like may be used interchangeably and are intended to mean identification of measurement data sourced from a particular piece of construction heavy machinery.

Figure 1:
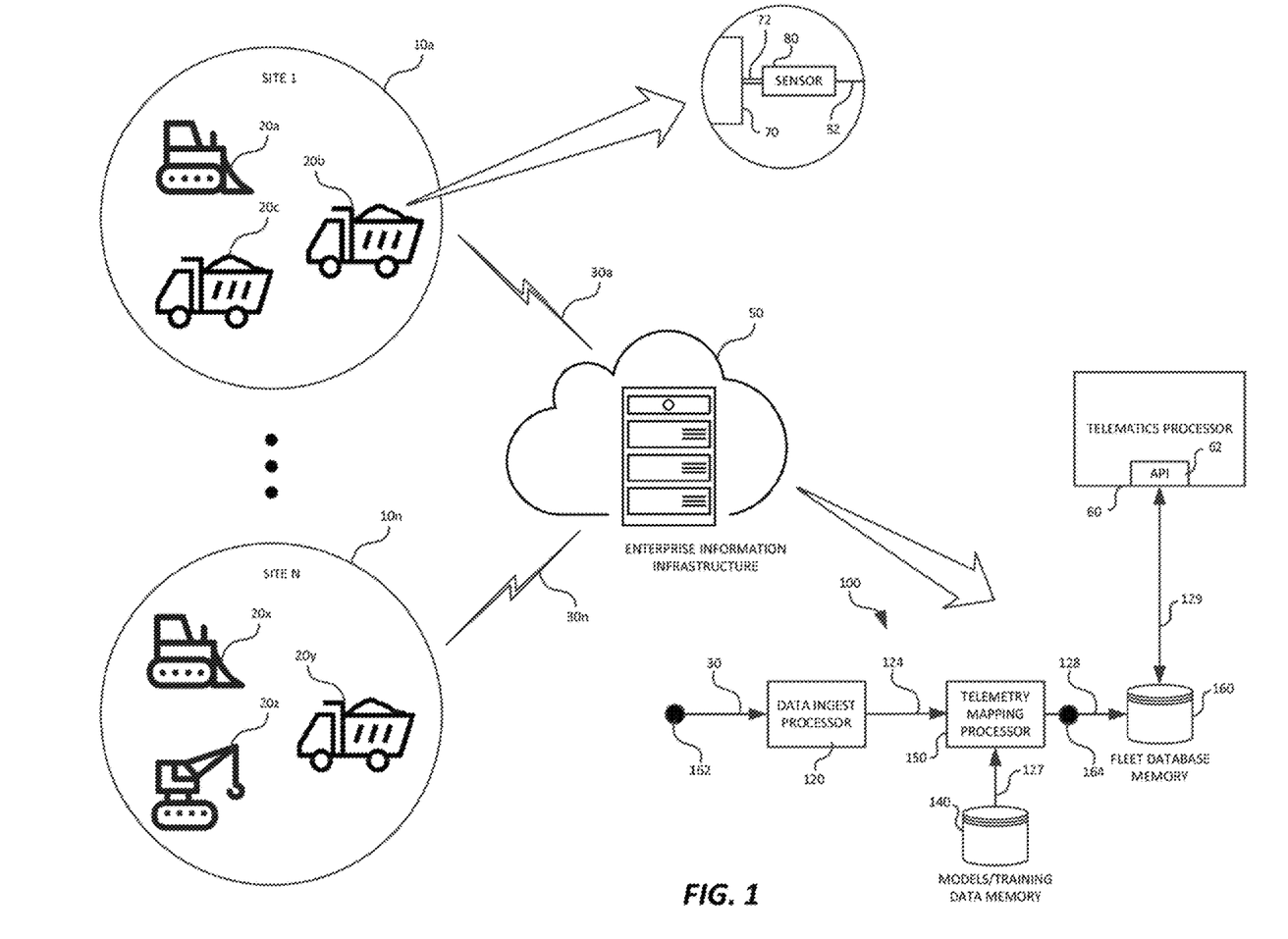
FIG. 1 is a schematic block diagram depicting an exemplary embodiment of the present disclosure in a heavy construction equipment context.

FIG. 1 is a schematic block diagram depicting an exemplary embodiment of the present invention in a heavy construction equipment context. In this example, it is to be assumed that an entity, such as a construction company, operates a fleet of heavy machinery comprising construction machines 20a-20z, representatively referred to herein as construction machine(s) 20, that is distributed over one or more machinery sites 10a-10n, representatively referred to herein as machinery site(s) 10. It is to be understood that the fleet may comprise many species of construction machines 20, where the term "species" is used herein to refer to the different kinds of heavy equipment, e.g., bulldozers, excavators, milling and paving machines, etc., that might be in a typical fleet of construction machines. Embodiments of the present invention may identify telemetry from many different species, i.e., a diverse fleet of construction machines 20.

For purposes of this example, it is to be assumed that construction machines 20 are equipped with a variety of sensors, representatively illustrated at sensor 80 and which will be referred to herein as sensor(s) 80, generating respective measurement signals from which telemetry data are derived. It is to be further assumed that construction machines 20 are outfitted with the capability for providing state information, e.g., telemetry data, over one or more communication channels 30a-30n, representatively referred to herein as communication channel(s) 30. Whereas the present invention is agnostic to the composition of communication signals and to the medium on which communication channels are constructed, communications in the present construction context are typically conducted over radio telecommunications. Radio equipment that would reside on both ends of communications channels 30 are not illustrated but well-known techniques are suitable to practice the invention and are to be considered as present in this example.

As illustrated in this figure, sensors 80 are typically coupled to a construction machine element 70, either by direct connection represented by sensor connection 72 or by other means, e.g., Hall detection. Sensors 80 may provide the measurement signal, representatively illustrated at measurement signal 82, indicative of the state of the construction machine element 70 being monitored. Modern heavy construction equipment typically utilizes hundreds of sensors measuring such items common to modern engines, such as oil pressure and engine speed, items specific to construction machinery, such as excavator arm position or motor grader drawbar angle, environmental items, such as ambient air temperature and humidity, etc., any or all of which may be identified through practice of the present invention. Those with skill in telemetry will appreciate the challenges of identifying such data without the source sensor being known and will further appreciate the inventive techniques described herein that overcome those challenges.

In FIG. 1, enterprise information infrastructure (EII) 50 represents a myriad of information technologies for which the present invention can be embodied. In this exemplary construction context, it is to be assumed that EII 50 not only comprises all of the memory capacity and computer processing resources necessary to implement the present invention, but also the memory and processing resources to implement a telematics processor 60. For this construction example, it is to be assumed that EII 50 is operated by an entity, e.g., the construction company mentioned above, or a third party service provider tasked with fleet management, referred to herein as a "fleet manager."

Telematics processor 60 represents a wide variety of platforms that might rely on the telemetry data provided by embodiments of the present invention. In this exemplary construction scenario, it is to be assumed that telematics processor 60 is constructed or otherwise configured to serve as a construction machine fleet management platform that combines processing circuitry and processor instructions to execute fleet management services for participating entities. The telemetry data, including those that have been identified by an embodiment of the invention, and other information acquired from machinery sites 10 may be stored in fleet database memory 160, which may be operated and controlled by the fleet manager. Telematics processor 60 may obtain access to fleet database memory 160 through an application programming interface (API) 62, the implementation details of which are not essential to the practice of the present inventive concept. As a construction machine fleet management platform, telematics processor 60 may query a fleet database (such as fleet database 165 depicted in FIG. 3) contained in fleet database memory 160 for telemetry data and may process that telemetry data for, among other things, presentation. Current construction machine fleet management platforms, such as those exemplified in the Background section of this application, may be used at telematics processor 60 without departing from the spirit and intended scope of the present invention.

As used herein, the term "ontology" is meant to refer to that which encompasses the representation, formal naming and definition of the categories, properties and relations between the concepts, data and entities that substantiate a domain of discourse, such as construction machinery. Different systems implement different ontologies and there is no guarantee that telemetry data from one brand of construction machine is consistent with the information scheme of another brand. The present invention may be embodied to map telemetry data of uncertain origin to the native ontology, i.e., the ontology implemented by the mapping system. That is, the native ontology may be restricted to nomenclature used by one manufacturer of construction equipment that is independent of and potentially different from the nomenclature used by another manufacturer of construction equipment.

Embodiments of the present invention may include a telemetry identification (ID) system 100 that accepts raw telemetry signals from machinery sites 10 at input port circuitry 162. AI logic embodied in an implementation of the present invention may assign telemetry data IDs to the telemetry data or, equivalently, the telemetry data channel IDs, that are most likely to be the correct identification of the telemetry data under scrutiny. The identified telemetry data and/or the telemetry data ID associated therewith may be provided at output port circuitry 164 and may be subsequently stored in accordance with the native ontology of fleet database memory 160 for use by interested entities, such as telematics processor 60.

Figure 2:
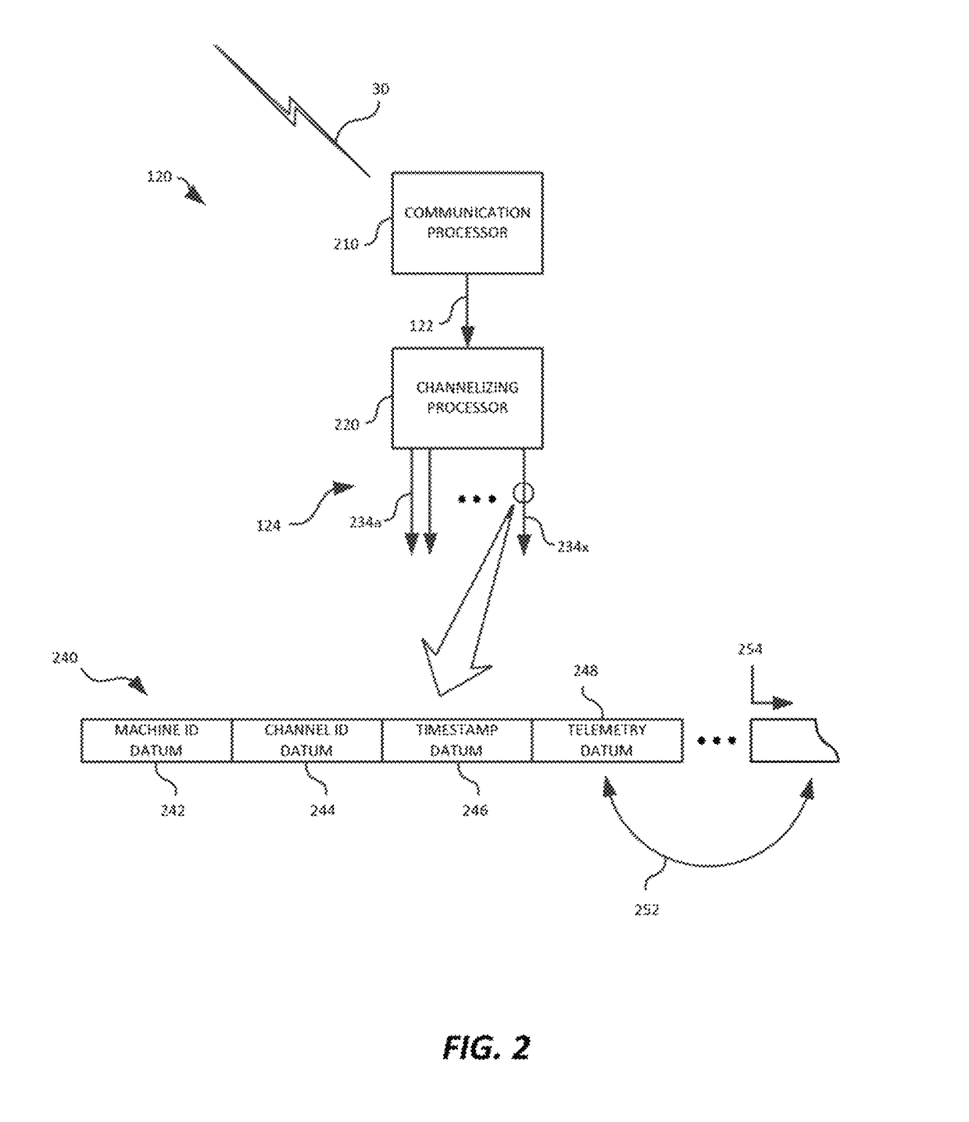
FIG. 2 is a schematic block diagram of an exemplary data ingest processor as it might be utilized in embodiments of the present disclosure.

In the exemplary embodiment of FIG. 1, data ingest processor 120 may be constructed or otherwise configured to accept at its input communication signals 30 and may provide at its output channelized telemetry data 124. Referring momentarily to FIG. 2, exemplary data ingest processor 120 is illustrated in schematic block diagram format as it might be utilized in embodiments of the present invention. In the depicted configuration, raw telemetry data 122 may be generated by a communication processor 210 that is constructed or otherwise configured to accept at its input communication signals 30, to suitably convert communications signals 30 to digital data, to decode communication channel and data, to perform error recovery, etc., the implementation details of which are specific to a particular communications protocol/medium and are not essential to the practice of the present inventive concept. The raw telemetry data 122 produced by communication processor 210 may be provided to channelizing processor 220, which may be constructed or otherwise configured to analyze raw telemetry data 122 as to their contents and to assign each telemetry datum to a corresponding serialized telemetry data channel 234a-234x, representatively referred to herein as serialized telemetry data channel(s) 234, in channelized telemetry data 124. Serialized telemetry data channels 234 may carry telemetry data that are associated serially by increasing/decreasing time signatures in timestamp datum 246, by like source construction machines, as identified by machine ID datum 242, and by channel ID datum, which may contain an identification name that is insufficient to glean what sensor measurements are contained in telemetry datum 248, at least to the construction company and fleet manager.

Channelizing processor 220 may sort, assemble, extract, transform, load, etc., raw telemetry data 122 into data structures that include respective data points, i.e., telemetry datum, and information regarding from where that data point came and at what time that measurement was made. Channelizing processor 220 may further associate raw telemetry data 122 one datum with another to form a series. In typical implementations, channelizing processor 220 may associate raw telemetry data 122 into separate time series, but the present invention may be practiced using other data series that are in an order other than temporal, but expected by the AI implementation. Exemplary serial telemetry data, specifically telemetry time series data, are discussed further below.

Serialized telemetry data channels 234 may be organized into data structures, representatively illustrated at telemetry channel series data structure 240. As one example, each telemetry channel series data structure 240 may comprise several data fields that allow for the formation of serialized telemetry data channels 234 even when the source of the telemetry data series is unknown. For example, telemetry channel series data structure 240 may include in its data fields: machine ID datum 242, channel ID datum 244, timestamp datum 246 and telemetry datum 248, which may be the sensor measurement. Machine ID datum 242 may be indicative of the particular construction machine 20 on which the associated measurement was made, e.g., a name assigned to the construction machine 20 through a fleet management platform, a serial number, etc. Channel ID datum 244 may be indicative of the telemetry channel to which telemetry datum 248 is associated. As discussed above, channel ID datum 244 may be nondescript, at least to the construction company and fleet manager, however telemetry data belonging to the same telemetry data channel may have like channel ID data. Telemetry channel series data structure 240 may further include a timestamp datum 246 that may indicate a measurement sample time at which telemetry datum 248 was acquired at the source construction machine 20. Of course, other data fields may be present in data structure 240, but the exemplary data fields illustrated in FIG. 2 are sufficient for an understanding of the present inventive concept by artisans skilled in information representation techniques and data processing.

As depicted in FIG. 2, each telemetry channel series data structure 240 of serialized telemetry data channels 234 is associated one with another, as represented by data structure association 252, in a manner by which a machine can retrieve or otherwise process channelized telemetry data 124 in a prescribed serial order. As noted above, for this exemplary construction machine fleet management embodiment, the series formed by data structure association 252 between telemetry channel series data structure 240 and additional linked telemetry channel series data structures 254 are time series that are ordinally arranged per the values assigned to timestamp datum 246.

Returning now to FIG. 1, channelized telemetry data 124 may be conveyed from data ingest processor 120 to telemetry mapping processor (TMP) 150, which may be constructed or otherwise configured with AI capability to identify telemetry data of uncertain origin and to provide the telemetry data identification to output port circuitry 164. As will be presently described, TMP 150 identifies such data using deep knowledge of, in this exemplary case, construction machinery stored in, for example, models/training data memory 140. As used herein, the term "deep knowledge" is meant to refer to computer-readable information extracted from large and typically multi-sourced data sets that is accessible via a computer-executable query on a topic. Deep knowledge may be acquired through extensive research, subject matter experts, experience in the field of discourse, in this example construction machinery, and other techniques by which a rich corpus of detailed topic-specific yet broad knowledge is constructed. Deep knowledge may contain not only structured data but also unstructured and semi-structured data.

As noted above and will be described in more detail below, TMP 150 may implement AI logic that requires training and, as such, may be communicatively coupled to models/training data memory 140 that may be constructed or otherwise configured to store therein model information that defines different AI logic configurations for respective construction machine species and training data by which the AI logic configurations may be trained. As illustrated in FIG. 1, TMP 150 may retrieve model/training data 127 and configure the AI logic therewith, may accept channelized telemetry data 124 from data ingest processor 120 and may provide telemetry ID data 128 to be stored in fleet database memory 160. Telematics processor 60 may acquire stored telemetry ID data 128 from fleet database memory 160 through, for example, fleet management API 62 and the associated application layer data transfer 129 for fleet management operations.

Figure 3:
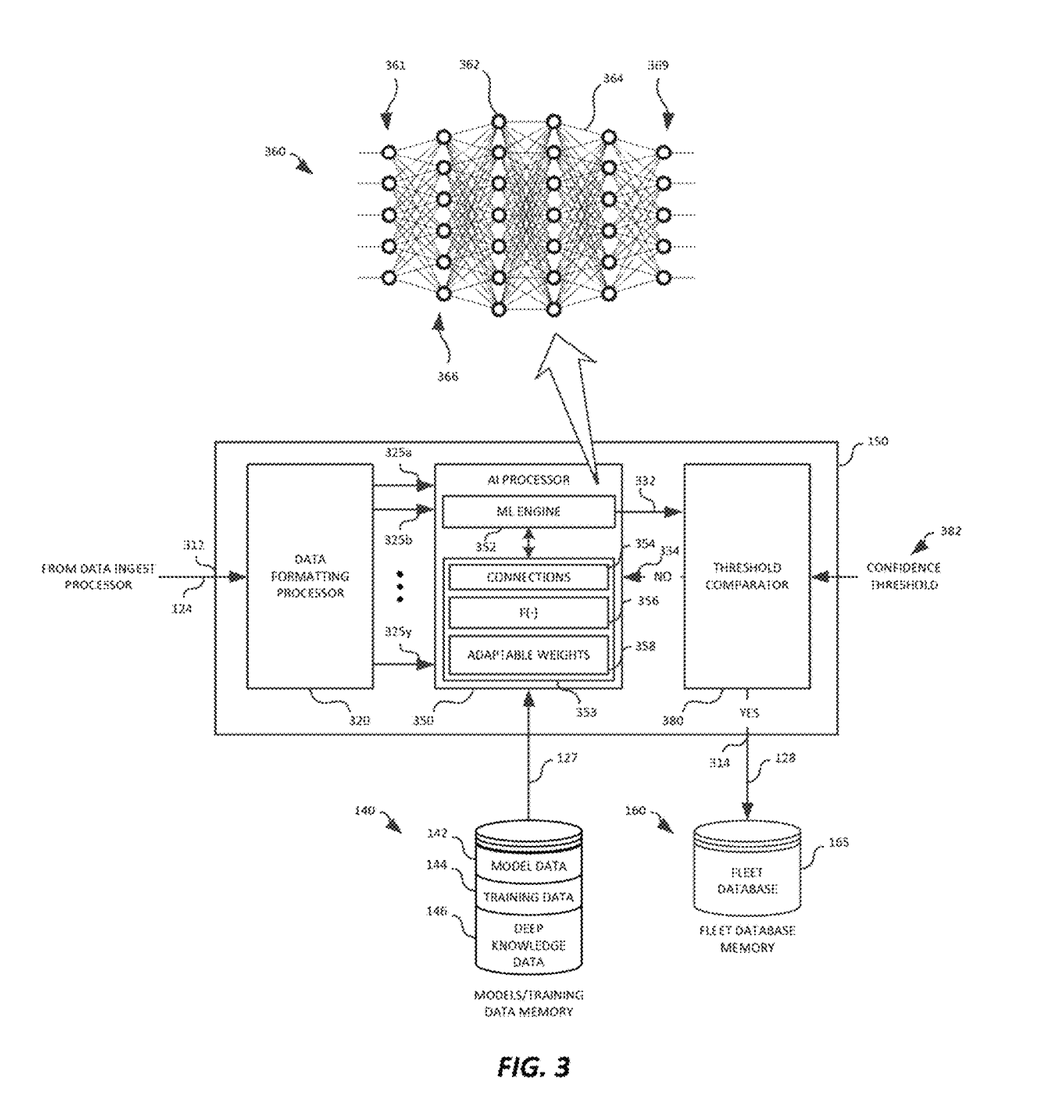
FIG. 3 is a schematic block diagram of an exemplary telemetry mapping processor by which the present general inventive concept may be embodied.

FIG. 3 is a schematic block diagram of an exemplary TMP 150 by which the present general inventive concept may be embodied. TMP 150 may implement the AI technology or AI logic, via hardware processing circuitry and, in certain embodiments, computer-readable processing instructions executing on the hardware circuitry. It is to be understood that the present invention may be embodied through different AI paradigms; however, the present example implements machine learning (ML) as the AI technique. Those having skill in AI will appreciate that ML is one example of AI that is conducive to the classification of data under scrutiny based on historical samples of data of similar classification, e.g., training, and deep knowledge of the source machinery. This and other information may be stored, for example, in models/training data memory 140.

As illustrated in FIG. 3, exemplary TMP 150 may comprise a TMP input port 312 constructed from circuitry by which it can be coupled to external system components to acquire information for processing and a TMP output port 314 constructed from circuitry by which it can be coupled to external system components to provide processed information. TMP 150 may be viewed as being constructed or otherwise configured from three (3) principal components communicatively interposed between TMP input port 312 and TMP output port 314: a data formatting processor 320, an AI processor 350 and a threshold comparator 380. Briefly, and as described in more detail below, channelized telemetry data 124 from data ingest processor 120 may be provided to data formatting processor 320 through TMP input port 312, whereat channelized telemetry data 124 may be processed into data structures expected by AI processor 350. Example data structures are described in greater detail below. AI processor 350 may compute a candidate solution or hypothesis, e.g., data indicating the IDs of channelized telemetry data 124 in terms of a native ontology selected when fleet database memory 165 stored in fleet database memory 160 was designed, typically when an enterprise-wide information system scheme was selected by a system designer. In certain embodiments of the present invention, the AI logic operates by constraining the candidate hypotheses towards IDing telemetry data of uncertain origin in terms of the ontology fixed in the design of fleet database 165.

A candidate solution, representatively illustrated at candidate channel ID data 332, may be provided to threshold comparator 380 where a confidence measure computed by AI processor 350 indicating a likelihood that candidate channel ID data 332 are the correct telemetry channel IDs for telemetry data of that telemetry channel, is evaluated against a confidence threshold 382. Confidence threshold 382 may be selected by, for example, an authorized system user that sets the threshold condition to avoid false positives, e.g., a wrong channel ID being assigned to a telemetry channel. Once set, the confidence measure is compared to confidence threshold 382, and, when the threshold condition is met, telemetry ID data 128 may be loaded into fleet database 165 via TMP output port 314.

In the illustrated embodiment, data formatting processor 320 may be constructed or otherwise configured to analyze incoming channelized telemetry data 124 and to identify and isolate the data into separate datasets according to the construction machine 20 from which each data channel originated. For every construction machine 20, or for those of interest, data formatting processor 320 may form a data structure having data fields arranged in accordance with processing requirements of AI processor 350. For example, data formatting processor 320 may produce machine-specific channel series data $325a$-$325y$, representatively referred to herein as machine-specific channel series data 325, that may be formatted into a data table, as is exemplified below, that is specific to a single construction machine 20.

As indicated above, ML is implemented as the AI paradigm in the present exemplary embodiment and AI processor 350 may be constructed or otherwise configured accordingly. For example, AI processor 350 may be equipped with an ML engine 352 that drives the AI procedures. ML engine 352 may be realized through a combination of hardware and software or, in some embodiments, through a strictly hardware machine to convey the telemetry data under scrutiny through a set of weights that are applied based on computer-executed decisions made in the machine. As illustrated in the figure, ML engine 352 may be communicatively coupled with memory circuitry 353 in which may be stored connections data 354, activation function executables 356 and adaptable weights 358, in which may be stored components of an artificial neural network (ANN) 360. Connections data 354 may comprise computer-readable information by which ML engine 352 can identify how nodes 362 of ANN 360 are interconnected by ANN edges 364, activation function executables 356 may comprise computer-readable information by which ML engine 352 can identify criteria on which computer-executable decisions are made at nodes 362 of ANN 360, such as whether attributes in the data provided to a node 362 are present. As used herein, the term "attribute" or "attribute data" is meant to refer to computer-identifiable characteristic(s) or feature(s) in the data presented to the machine, e.g., AI processor 350. Adaptable weights 358 may comprise computer-readable information by which ML engine 352 can identify how propagated decision results are scaled at different edges 364 of ANN 360. As used herein, the term "decision results" is intended to refer to an indication produced at the output of a node 362 as to whether information provided to that node 362 meets a decision criterion, which, in the ML example described herein, may be determined by an activation function executable 356 associated with that node 362. The decision results may be "propagated" through ANN 360, meaning a decision result output at one node 362 may be scaled and passed on an edge 364 to another node 362 at which another decision result is computed and that other decision result is scaled and passed on another edge 364 to yet another node 362, and so on, from an input layer 361, through any hidden layers 366 and finally to an output layer 369 of ANN 360. In certain embodiments, ANN 360 may implement deep learning and, as such, ANN 360 may have a large number of layers, e.g., hidden layers 366, each having nodes 362 that are to varying degrees connected to nodes 362 of another layer, e.g., another hidden layer 366, through a large number of edges 364.

As illustrated in FIG. 3, AI processor 350 may have access to models/training data memory 140 from which initialization and operating data may be stored, such as models data 142, training data 144 and deep knowledge data 146. For example, models data 142 may contain data indicative of different AI models, each defining a specific ANN configuration that targets the identity of telemetry data from a species of construction machine. Training data 144 may contain samples of labeled and verified telemetry data for training ANN 360 and deep knowledge data 146 may contain deep knowledge on a large number of construction machines of different types, different brands, different feature complements and so on. In certain embodiments, deep knowledge data 146 may be accessible to the AI process for queries into known knowledge of construction machinery, such as for purposes of training ANN 360.

Machine-specific channel series data 325 may be provided to exemplary AI processor 350 for telemetry identification, such as by way of exemplary ANN 360. Exemplary AI operations directed towards such telemetry identification are exemplified with reference to FIG. 4 below. For the present discussion, it is sufficient to say that ANN 360 may generate a hypothesis as candidate channel ID data 332 and may provide that hypothesis to threshold comparator 380. Further, ANN 360 may be constructed or otherwise configured to accept deficient channel ID data 334 and to reapply the AI logic thereto.

Threshold comparator 380 may be constructed or otherwise configured to accept candidate channel ID data 332 generated by AI processor 350, which may contain a hypothesized (computed) ID of the telemetry channel and a confidence measure (likelihood) that the hypothesized channel ID is correct for the telemetry data under scrutiny. Threshold comparator 380 may assess whether candidate channel ID data 332 meets a confidence threshold 382 as may be selected by an authorized user. If candidate channel ID data 332 meets confidence threshold 382, threshold comparator 380 may store candidate channel ID data 332 as telemetry ID data 128; otherwise, candidate channel ID data 332 is returned as deficient channel ID data 334 to AI processor 350 for further ID processing.

Figure 4:
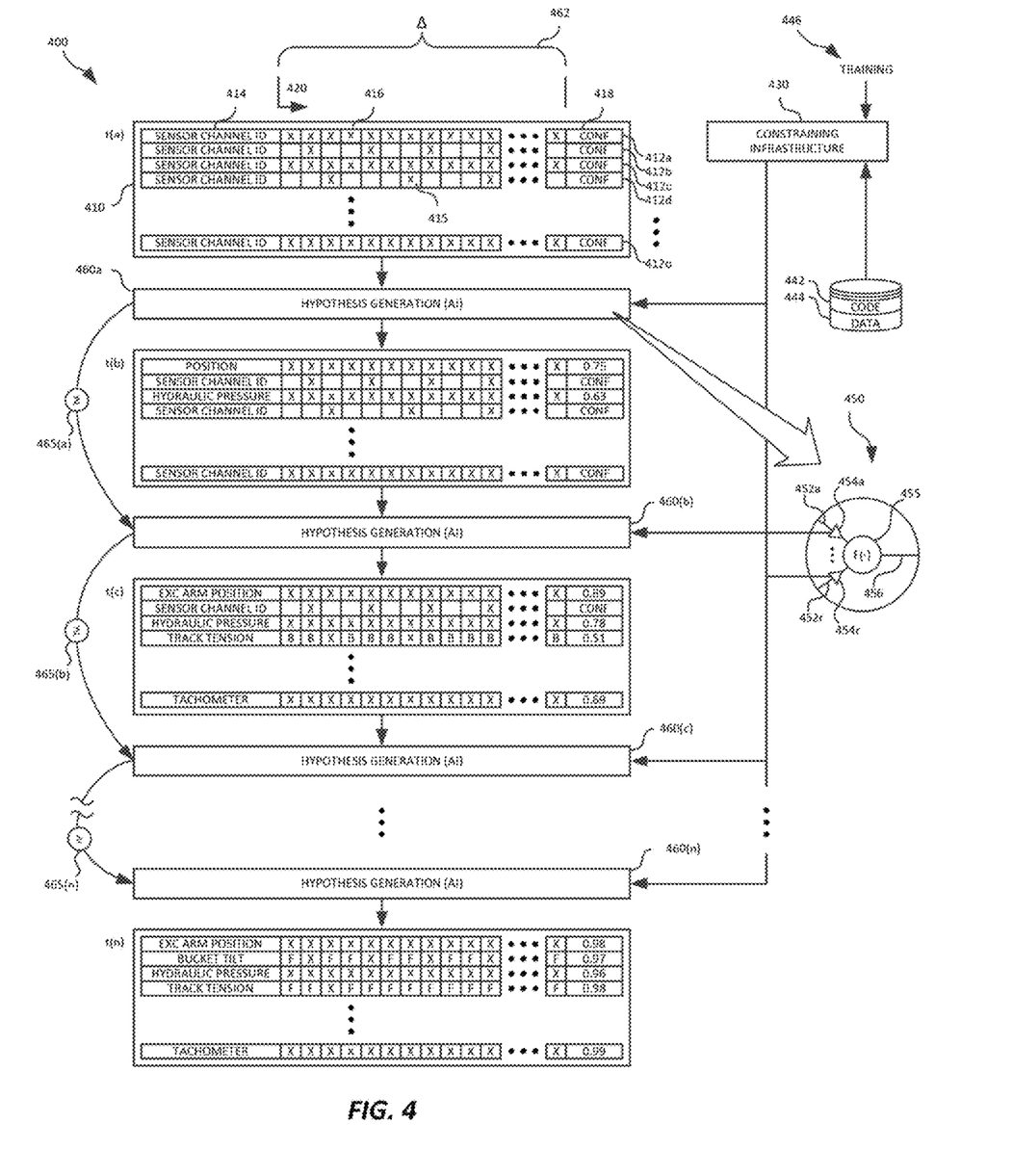
FIG. 4 is a processing flow diagram depicting an exemplary AI telemetry ID process flow by which the present disclosure may be embodied.

FIG. 4 is a processing flow diagram depicting an exemplary telemetry ID process 400 by which the present invention may be embodied. FIG. 4 is an abstraction of a telemetry ID technique using AI, e.g., the ML described above, that is intended to embrace general AI implementations and can be used to embody the present invention. Broadly speaking, exemplary telemetry ID process 400, which may be executed by AI processor 350, may be performed over a number of cycles, each comprising a hypothesis generation operation 460a-460n, representatively referred to herein as hypothesis generation operation(s) 460, and a confidence decision 465a-465n, representatively referred to herein as confidence decision(s) 465. In FIG. 4, a not-greater-than-or-equal-to symbol in a confidence decision 422 indicates that the confidence measure contained in CONF variables does not meet a confidence threshold condition and a greater-than-or-equal-to symbol in a confidence decision 422 indicates that the confidence measure contained in CONF variables meets the confidence threshold condition.

Telemetry data ID hypotheses may be generated using AI at each hypothesis generation operation 460 within the boundaries and/or under restrictions imposed thereon by constraining infrastructure 430, which may be implemented by, for example, AI code 442 (e.g., activation functions, etc.) and AI data 444 (e.g., weights, etc.). Constraining infrastructure 430 may compel or otherwise constrain telemetry ID process 400 towards a desired set of solutions (e.g., candidate telemetry channel IDs). For example, telemetry ID process 400 may be constrained by way of AI training procedures, representatively illustrated at training procedures 446, that configure constraining infrastructure 430 in accordance with, for example, the minimization or maximization of a suitable cost function. Additionally, telemetry ID process 400 may be constrained by way of selection of activation functions F(·) that are executed to make decisions, as described below.

Hypotheses may be produced by telemetry ID process 400 through evaluating attributes in test data, e.g., channelized telemetry data 124, by way of thousands, if not millions of sequential decisions that are based on known, characterized or otherwise classified historical data utilized by training procedure 446. These decisions may be executed through a set of interconnected decision processors, representatively illustrated at decision processor 450 and not to be confused with the mechanisms of confidence decisions 465. For the exemplary ANN 360 previously described, those decisions may be performed via activation functions F(·) executed at neuron node 455 that takes as its input (except at input layer 361, for example) on neuron inputs 452a-452r (ANN edges 364), representatively referred to herein as neuron input(s) 452, previous decision results propagated thereto from other neuron nodes 455. The decisions at each decision processor 450 (e.g., neuron firings), however, may be biased. That is, at each decision processor 450, activation function F(·) may take as its input(s), for example, a sum of neuron inputs 452 that may have been respectively weighted by input weights 454a-454r, representatively referred to herein as input weight(s) 454. In the abstraction of FIG. 4, input weights 454 are to be considered components of constraining infrastructure 430 (as are the choice of activation function F(), and network design and construction) in that they are set, such as through training procedures 446, to bias the decision made at each neural node 455, For example, input weights 454 may be distributed across inputs of each neural node 455 so as to place greater weight on salient telemetry data attributes and lesser weight on less notable, yet nevertheless worthwhile attributes so that higher importance is placed on certain information on which the decisions are made, as may have been established through training, and the impact of undesired or unimportant information on a correct decision at neural node 455 may be diminished. Hence, it is believed correct to generally describe telemetry ID process 400 as generating telemetry ID hypotheses by constraining a set of processor-executed decisions on telemetry data of uncertain origin towards a telemetry data ID that is consistent with a native information scheme or ontology, e.g., data types, etc., that was selected, and often fixed, when an enterprise's information management system, however sophisticated, was designed and constructed.

As previously described, data formatting processor 320 may be equipped to place channelized telemetry data 124 in condition for processing by AI processor 350. In the example of FIG. 4, channelized telemetry data 124 is formatted into data tables, e.g., telemetry data table 410, which is viewed in the figure at AI processing instances t(a)-t(n). Telemetry data table 410 may be constructed for a specific construction machine 20 and may comprise a set of data fields that may be addressed by specification of a telemetry data table row, representatively illustrated at telemetry data table rows 412a-412o and representatively referred to herein as telemetry data table row(s) 412 when a particular row is not necessary to the discussion, and a telemetry data table column, e.g., telemetry data table column 414 containing channel IDs (unknown variables SENSOR CHANNEL ID), a telemetry data table column containing measurement/sensor data, representatively illustrated at telemetry data column 416 and referred to herein as telemetry data table column(s) 416, and a telemetry data table column, representatively illustrated at telemetry data table column 418, containing a confidence measure in variable CONF that indicates a likelihood that the hypothesized channel ID in variable SENSOR CHANNEL ID correctly identifies the measurement data in telemetry data table columns 416.

Each telemetry data table row 412 may comprise telemetry time series data 420 in telemetry data table columns 416 that were taken over a time series sample period A. In FIG. 4, an "X" in telemetry time series data 420 is meant to indicate a value assigned through measurement by the questioned source sensor at that particular sampling instance, representatively illustrated at sampling instance 415. Embodiments of the present invention may be constructed or otherwise configured for inclusion of time series data 420 acquired at different sampling rates; an empty data field of telemetry time series data 420 is meant to indicate that no measurement sample, representatively illustrated at telemetry data sample 415, was taken at that particular sampling instance and at that particular construction machine 20. In other words, temporal spacing in telemetry time series data 420 included in telemetry data table 410 need not be equal across telemetry channels.

At AI processing time t(a), telemetry data table 410 may be newly configured by data formatting processor 320 and newly provided to AI processor 350. SENSOR CHANNEL ID and CONF variables may be empty or otherwise assigned a NULL value.

At AI processing time t(b), certain channel IDs in telemetry data table 410 may have been hypothesized and assigned to appropriate SENSOR CHANNEL ID variables. For example, telemetry ID process 400 may determine that telemetry time series data 420 in telemetry data table row 412a resembles position sensor data, although the construction machine component whose position is being measured may remain uncertain. Additionally, telemetry time series data 420 in telemetry data table row 412c may resemble hydraulic pressure sensor data, the identity of which may have been hypothesized in hypothesis generation operation 420b as having attributes that are causally related with positioning a component of the corresponding construction machine. That is, various components of construction heavy equipment are hydraulically operated and, as such, a change in position of such a component may induce a change in hydraulic pressure, even if very brief. Embodiments of the present invention may implement an ANN network architecture that extracts attributes from each set of telemetry time series data 420 and makes decisions based on comparisons of those attributes to known information, e.g., deep knowledge data 146, including known causal relationships between measurement series.

The probability that a hypothesized telemetry channel ID in a SENSOR CHANNEL ID variable correctly identifies/classifies telemetry time series data 420 for that telemetry data table row 412 is maintained in the corresponding row's CONF variable. A determination may be made as to the confidence (likelihood) that the subject hypothesis for the telemetry time series data 420 in that telemetry data table row 412 is correct at each confidence decision 422. A telemetry channel identified with higher a level of confidence may be used as if valid in the identification of other telemetry time series data 420 in other rows 412 of telemetry data table 410.

At AI processing time t(c), having been returned to telemetry ID process 400 due to a failure to meet the confidence threshold condition at confidence decision 465b and subjected to additional processing, additional hypotheses may be sought and assigned to SENSOR CHANNEL ID variables. As illustrated in FIG. 4, the telemetry time series data 420 in telemetry data table row 412a previously hypothesized as being position sensor data may have been further classified as an excavator arm position sensor with a higher confidence measure assigned to the corresponding CONF variable. Additionally, telemetry time series data 420 in telemetry data row 412o may have been hypothesized as being tachometer data, which may have also been identified through attributes they may have in common with, for example, hydraulic pressure.

Additionally, at AI processing time t(c), telemetry time series data 420 in telemetry data table row 412d may be hypothesized as being track tension data derived from sensors of a track-propelled excavator. Accordingly, an indication of such may be assigned to the SENSOR CHANNEL ID variable as illustrated. In arriving at the foregoing hypothesis, telemetry ID process 400 may rely on attributes of track tension data acquired from known excavator construction machines but that are absent in the telemetry data as received. For purposes of this discussion, the attributes that may be relied upon are depicted in FIG. 4 as being inserted into telemetry time series data 420 as groups of the letter "B" in telemetry data table row 412d. However, embodiments of the invention may not actually perform an explicit insertion operation. Indeed, the data insertion depicted in FIG. 4 may be achieved not by insertion but by an association of the inserted data with the temporal span over which telemetry data samples 415 are absent. Moreover, the data insertion depicted in FIG. 4 is not necessarily interpolation, as the term is used in signal processing circles, but rather an assignment of known attribute data to a period of time in telemetry time series data 420 that likely would be present therein if the channel ID hypothesis were found to be true. Nevertheless, these attributes will be referred to as "inserted attributes" to simplify the explanation. The inserted attributes may be relied upon by telemetry ID process 400, to the extent that they are hypothetical, for decision making in the ANN as if those attributes were present in the original telemetry time series data. That is, decisions of telemetry ID process 400 may be made on the inserted attributes as if the hypothesized channel ID in the SENSOR CHANNEL ID variable, e.g., "Track Tension," were true. In certain embodiments of the present invention, the "Track Tension" hypothesis may prove to be incorrect in that the inserted attributes do not fit with known construction machinery knowledge of track tension sensor data in relation to other telemetry time series data 420 in other telemetry data table rows 412. In such case, a new channel ID hypothesis may be generated, and new attributes may be assigned to "empty" periods in telemetry time series data 420 as before.

At AI processing time t(n), it may have been determined via confidence decision 420 that the telemetry channel IDs in telemetry data table column 414 hypothesized to a confidence level (likelihood) indicated in telemetry data table column 418 meets the confidence threshold condition. Accordingly, the identified telemetry time series data 420 may be stored in association with respective channel IDs that are consistent with the information scheme of the target information management system, such as in fleet database memory 160. As illustrated in FIG. 4, telemetry time series data 420 in telemetry data table row 412(b) may have been identified by telemetry ID process 400 as being bucket tilt data, as might be measured by sensors on and around an excavator bucket, and the SENSOR CHANNEL ID variable for telemetry data table row 412(b) may have been assigned a suitable indication of such. The hypothetical channel ID for which attribute data was inserted, an "F" in telemetry data table rows 412(b) and 412(o) is meant to indicate that inserted attributes are finalized and are consistent with a sensor configuration for the construction machine 20 under scrutiny.

Figure 5:
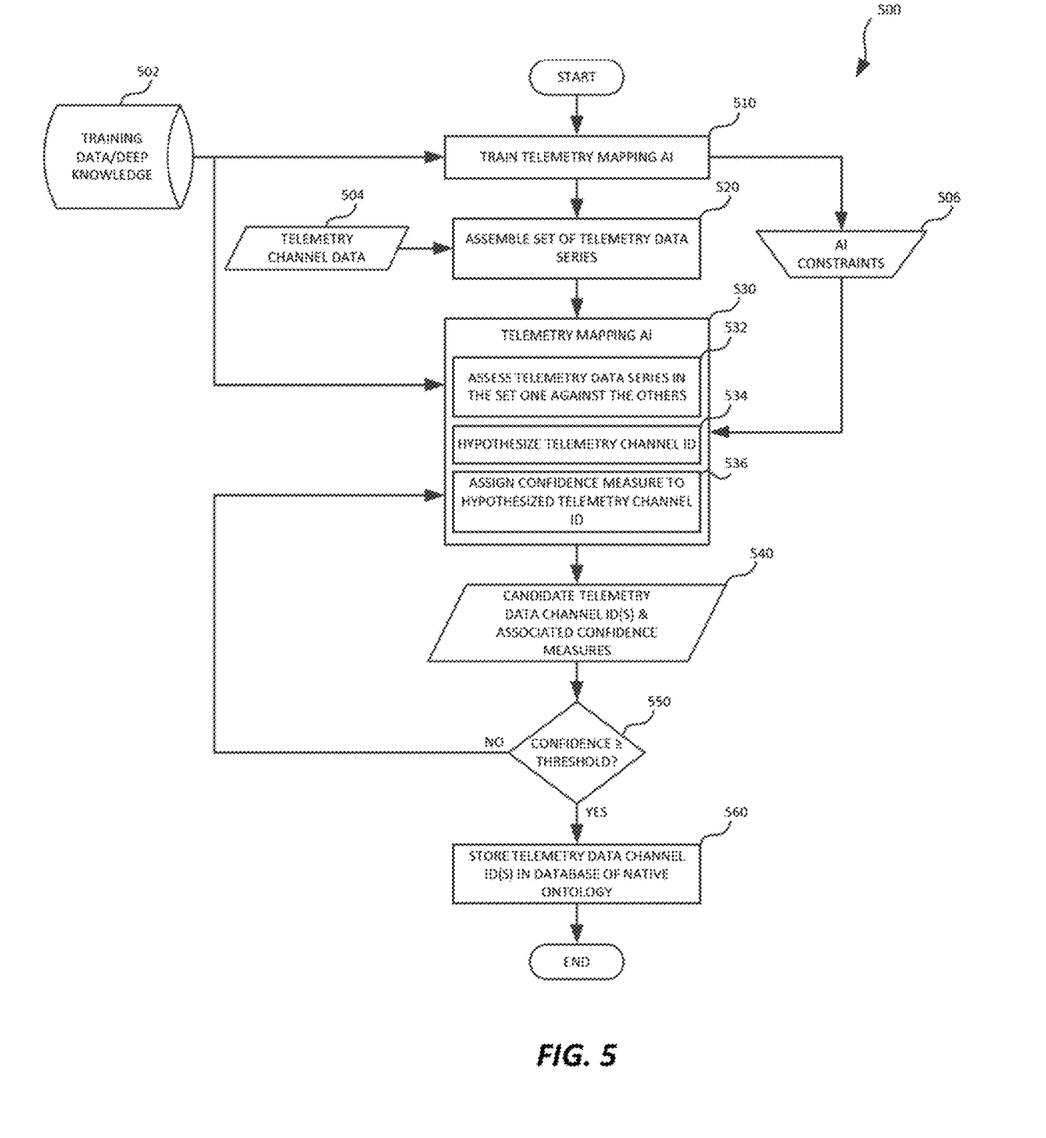
FIG. 5 is a flow diagram of an exemplary telemetry ID process by which the present disclosure may be embodied.

FIG. 5 is a flow diagram of an exemplary telemetry channel ID process 500 by which the present invention may be embodied. In operation 510, telemetry mapping AI 530 may be trained using training data and deep knowledge stored in training data/deep knowledge database 502. Such training may generate weight values and the like that constrain telemetry mapping AI 530 towards a set of desired solutions, e.g., construction machine measurement IDs, representatively illustrated in FIG. 5 as AI constraints 506.

Once telemetry mapping AI 530 has been trained, telemetry ID process 500 may execute operation 520 by which telemetry channel data 504, e.g., construction machine telemetry channel data, are accepted and by which a set of telemetry data series, e.g., telemetry time series data 420, are assembled. For example, the set of telemetry data series may be formatted into a data table, such as telemetry data table 410, which may be provided to telemetry mapping AI 530.

Using AI logic of telemetry mapping AI 530 operating under AI constraints 506, operation 532 may be executed by which a telemetry data series in the set, referred to hereinafter as the "telemetry series under scrutiny," is assessed against other telemetry data series in the set. Based on that assessment, a telemetry channel ID for the telemetry data series under scrutiny may be hypothesized in operation 534. In operation 536, telemetry ID process 500 may generate a confidence measure indicating a likelihood that the hypothesized telemetry channel ID correctly identifies the telemetry data series under scrutiny. The confidence measure (as well as the hypothesized telemetry data channel ID in a native ontology) may be based, at least in part, on how well the telemetry data series under scrutiny compares with a known telemetry data series stored in training data/deep knowledge database 502 that has a like telemetry data channel ID as the hypothesized telemetry channel ID. In operation 550, the hypothesized telemetry channel ID and associated confidence measure 540 may be evaluated against a selected confidence threshold. If the confidence measure computed by telemetry channel ID process 500 meets the confidence threshold condition, e.g., the computed confidence measure≥the selected confidence threshold, the telemetry channel ID may be stored in a memory, such as fleet database memory 160, in the native ontology in a manner that provides access to interested entities. If, however, the confidence measure computed by telemetry channel ID process 500 does not meet the confidence threshold condition, the hypothesized telemetry channel ID and the associated telemetry data series under scrutiny is returned to telemetry mapping AI 530 for further telemetry channel ID procedures.

In some embodiments of the present invention, telemetry mapping AI 530 may provide a best hypothesized telemetry channel ID by comparing specific telemetry channel data against all other telemetry channel data in the data set as well as against information stored in training data/deep knowledge database 502. For example, a telemetry channel ID, unknown to telemetry mapping AI 530, may be associated with airflow restriction measurements in the corresponding telemetry data series. Telemetry mapping AI 530 may compare the measurement values (telemetry data) of the channel hypothesized to be airflow restriction measurements with other telemetry channel data contained in other telemetry channels that may also be unknown. Telemetry mapping AI 530 may determine that because, for example, one telemetry data series in the set of telemetry channel data increases during the same period of time in which one or more other telemetry data series in the set decrease, the telemetry data series in the subject telemetry data channel may be hypothesized as air restriction measurement data with a computed confidence measure. Telemetry channel ID process 500 may then compare that hypothesized telemetry channel ID to deep knowledge in training data/deep knowledge database 502, locate a similar data pattern in training data/deep knowledge database 502, and may identify the channel as "Air Restriction" upon the confidence measure meeting the confidence threshold.

INDUSTRIAL APPLICABILITY

As with any industrial setting, construction machine fleet management typically includes maintenance, both corrective and preventative, developed to maintain the working order of construction machine members of the fleet. To that end, modern construction machines, aka heavy equipment, are outfitted with a wide array of sensors and communications equipment by which measurements made by those sensors (telemetry) are transmitted to the fleet management system. Situations arise in heavy construction equipment industrial settings in which the fleet is populated with construction machines of diverse origin (e.g., brand) for which it is unclear as to what telemetry data (sensor measurement) is conveyed on which telemetry data channel. That is, while the fleet management system may identify a telemetry data channel as carrying what appears to be valid telemetry data, the data channel is unlabeled or its identity is otherwise indiscernible from the received data. The problems surrounding this issue are compounded when the manufacturer of the construction equipment in question is unforthcoming as to the identities of respective telemetry data channels (source sensors) on which their telemetry data are conveyed from their brand of machine. Principles of the general inventive concept described in this disclosure address such situations.

Embodiments of the present invention leverage vast knowledge of construction machinery obtained through decades of manufacturing experience, engineering design and consultations with subject matter experts, industrial research and product development efforts generating billions of measured data points stored in large capacity and generally accessible memory, etc. towards a technique for the automated identification of construction machine telemetry data. In one embodiment, such "deep knowledge" is brought to bear in the design and construction of an artificial intelligence machine that accepts telemetry data of uncertain origin and, through a set of decisions executed within the machine, produces candidate telemetry channel identification data (hypothetical solutions) at its output. Candidate telemetry channel identification data may be considered sufficiently accurate when a confidence measure generated by the artificial intelligence machine meets a confidence threshold condition, e.g., the confidence measure is equal to or greater than a selected confidence threshold. Otherwise, the candidate telemetry channel identification data is returned to the artificial intelligence machine in which new, different and/or modified hypotheses as to the identities of the received telemetry data are generated.

Construction machine fleet management platforms of the current art excel at organizing information regarding member machines of the fleet, including telemetry data received from remote construction machines. They are limited, however, to labeled or otherwise known telemetry data which itself is limiting in the types of construction machines that can be effectively managed by the platform. Embodiments of the present inventive concept obviates a requirement that the telemetry data arrive at the platform identified as to its source.

Certain embodiments of the present general inventive concept provide for the functional components to manufactured, transported, marketed and/or sold as processor instructions encoded on computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions may be encoded and then subsequently retrieved, decoded and executed by a processor, including electrical, magnetic and optical storage devices. Examples of non-transitory computer-readable recording media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present general inventive concept as exemplified by the embodiments described above.

The figures described herein include schematic block diagrams illustrating various interoperating functional modules. Such diagrams are not intended to serve as electrical schematics and interconnections illustrated are intended to depict signal flow, various interoperations between functional components and/or processes and are not necessarily direct electrical connections between such components. Moreover, the functionality illustrated and described via separate components need not be distributed as shown, and the discrete blocks in the diagrams are not necessarily intended to depict discrete electrical components.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Additionally, unless made clear otherwise, the term "processor" is intended to refer to circuitry and processing instructions, if any (the invention does not preclude purely hardware implementations), that overall provide one or more signal/data processing services. Separate references to processor circuitry and processor instructions, where appropriate, will be readily apparent in the descriptions below.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

The invention claimed is:

1. A computer-implemented fleet management system for managing a diverse fleet of construction machines, the fleet management system constructed to identify construction machine telemetry data for which telemetry channel identifications (IDs) are indiscernible, the system comprising:
   an AI processor constructed to:
      configure an artificial neural network (ANN) with processor-adaptable weights on edges thereof that are applied to decision results of processor-executable decisions performed at nodes thereof,
      train the ANN to assign values to the weights based on known telemetry data as identified by respective known telemetry channel IDs in a native ontology,
      execute the trained ANN on a set of telemetry data series assembled from the construction machine telemetry data received from a member construction machine of the fleet of construction machines to generate thereby one or more candidate telemetry channel IDs for the respective telemetry data series, the candidate telemetry channel IDs being restricted by the weighted decision results to the native ontology that utilizes nomenclature of a manufacturer of the construction machines that is independent of the nomenclature used by another manufacturer of other construction machines, and
      compute a confidence measure indicative of a likelihood that the candidate telemetry channel IDs correctly identify the telemetry data series;
   a threshold comparator circuit constructed to compare the computed confidence measure with a confidence threshold and, if the computed confidence measure meets the confidence threshold, the candidate telemetry channel IDs are provided as the telemetry channel IDs of the telemetry data series arriving from the member construction machine; and a telematics processor constructed to perform fleet management operations for the fleet of construction machines based thereon the telemetry channel IDs, wherein the generation of the one or more candidate telemetry channel IDs includes mapping the construction machine telemetry data for which telemetry channel identifications (IDs) are indiscernible to the native ontology.

2. The fleet management system of claim 1, further comprising a data formatting processor constructed to:

assemble the set of telemetry data series into a corresponding set of time series temporally aligned one with another across the set of time series.

3. The fleet management system of claim 2, wherein the AI processor is further constructed to:

associate a data attribute in a temporal span of a known time series taken from a known construction machine of like species as that of the member construction machine with the temporal span in a time series of the set of time series over which time series samples are absent; and execute the configured ANN on the data structure containing the time series with the associated data attribute to generate the candidate telemetry channel ID therefor.

4. The fleet management system of claim 3, wherein the AI processor includes a machine learning (ML) engine that is constructed to apply the weights to the decision results and to propagate the weighted decision results through the ANN to produce the candidate telemetry channel identification IDs.

5. The fleet management system of claim 4, wherein the ML engine is constructed to perform the processor-executable decisions by executing activation functions at the nodes of the ANN.

6. The fleet management system of claim 1, wherein the threshold comparator circuit is constructed to compare the confidence measure computed for each telemetry data series separately with the confidence threshold.

7. The fleet management system of claim 1, further comprising:

a fleet database of construction machine data in which the known telemetry data identified by the respective known telemetry channel IDs are stored in a defined native ontology and in which the telemetry channel IDs provided by the AI processor are stored in the native ontology; and a data formatting processor constructed to assemble the telemetry data series into a data structure associated with the member construction machine, the data structure being provided to the trained ANN for execution thereon.

8. The fleet management of claim 7, wherein the set of telemetry data series are ordinally aligned with other telemetry data series in the set of telemetry data series across the data structure.

9. The fleet management system of claim 1, further comprising:

sensors installed on the construction machines of the diverse fleet, wherein the AI processor receives the construction machine telemetry data from the sensors installed on the construction machines.

10. A process that identifies a set of telemetry data series generated from respective measurements made at a member construction machine of a fleet of construction machines and for which telemetry channel identifications (IDs) are indiscernible, the process comprising:

assigning values to weight data based on known telemetry data identified by respective known telemetry channel IDs for other construction machines of like species as the member construction machine;

configuring an artificial neural network (ANN) with the weight data on the edges thereof that are applied to decision results of processor-executable decisions performed at nodes thereof;

executing the configured ANN on the set of telemetry data series to generate thereby candidate telemetry channel IDs for one or more telemetry data series in the set of telemetry data series, the candidate telemetry channel IDs being restricted by the decision results to a native ontology that utilizes nomenclature of a manufacturer of the construction machines that is independent of the nomenclature used by another manufacturer of other construction machines;

compute a confidence measure indicative of a likelihood that the candidate telemetry channel IDs correctly identify the telemetry data series;

computing a confidence measure indicative of a likelihood that one or more of the generated candidate telemetry channel IDs correctly identifies the respective telemetry data series in the set of telemetry data series; and comparing the computed confidence measure with a confidence threshold and, if the computed confidence measure meets the confidence threshold, provide the candidate telemetry channel IDs as the telemetry channel IDs of the telemetry data series, wherein the generation of the candidate telemetry channel IDs includes mapping the set of telemetry data series for which telemetry channel identifications (IDs) are indiscernible to the native ontology.

11. The process of claim 10, wherein said assigning values to the weight data further comprises:

assigning the values to the weight data based on the known telemetry channel IDs that adhere to a native ontology that is independent of an ontology to which the indiscernible telemetry channel IDs adhere.

12. The process of claim 11, wherein the native ontology includes entity-specific telemetry channel IDs to which the candidate telemetry channel IDs are restricted.

13. The process of claim 12, wherein the entity-specific telemetry channel IDs are drawn from nomenclature used by a manufacturer of the construction machines that is independent of the nomenclature used by another manufacturer of the construction machines.

14. The process of claim 11, further comprising:

assembling the set of telemetry data series into a data structure in which the telemetry data series are ordinally aligned one with the others across the data structure; and executing the configured ANN on the data structure to generate the candidate telemetry channel IDs.

15. The process of claim 14, wherein said assembling the set of telemetry data series into the data structure further comprises:

assembling the set of telemetry data series into a corresponding set of telemetry time series temporally aligned one with another across the data structure.

16. The process of claim 15, further comprising:

associating a data attribute in a temporal span of a known time series taken from construction machines of like species as that of the member construction machine with the temporal span in one of the telemetry time series in the set thereof over which time series samples are absent; and executing the configured ANN on the data structure containing the telemetry time series with the associated data attribute to generate the candidate telemetry channel ID data.

17. The process of claim 15, wherein the native ontology includes entity-specific telemetry channel IDs that are drawn from nomenclature used by the manufacturer of construction machines that is independent of the nomenclature used by the manufacturer of the member construction machine.

18. An apparatus that identifies telemetry data generated from measurements made by sensors installed on machines of different species, the apparatus comprising:

input circuitry constructed to communicatively accept telemetry data of uncertain origin from among the sensors;

output circuitry constructed to communicatively provide an identification of the telemetry data accepted at the input circuitry;

memory circuitry constructed to store constraint information including weight data and decision criteria, and processing circuitry communicatively interposed between the input circuitry and the output circuitry and communicatively coupled to the memory circuitry, the processing circuitry constructed to retrieve the constraint information from the memory circuitry and to configure therewith an artificial neural network (ANN) that is executed thereby, the ANN deriving the identification of the telemetry data through processor-executable decisions that are based on the decision criteria, decision results of the respective decisions being modified by the weight data, candidate telemetry channel IDs generated by the ANN being restricted by the weighted decision results to a native ontology that utilizes nomenclature of a manufacturer of the construction machines that is independent of the nomenclature used by another manufacturer of other construction machines; and compute a confidence measure indicative of a likelihood that the candidate telemetry channel IDs correctly identify the telemetry data, wherein the candidate telemetry channel IDs are generated via mapping of the telemetry data of uncertain origin from among the sensors to the native ontology.

19. The apparatus of claim 18, wherein the processing circuitry is further constructed to:

compute a confidence measure indicating a likelihood as to whether the telemetry data provided to the ANN are correctly identified thereby;

execute a comparison between the computed confidence measure and a selected confidence threshold; and convey the identification of the telemetry data to the output circuitry in response to the executed comparison indicating that the computed confidence measure meets the selected confidence threshold.

20. The apparatus of claim 18, wherein the processing circuitry is further constructed to:

derive the constraint information from measurements made at known machines that include species in common with the different species of the machines; and apply the weight data of the derived constraint information across input edges of respective nodes of the ANN to bias the decision results produced by the respective activation functions executed thereat towards production of the identity of the telemetry data that is according to a native ontology, wherein the native ontology is restricted to telemetry channel IDs associated with species of construction machines that are drawn from nomenclature used by a manufacturer of the construction machines that is independent of nomenclature used by the manufacturer of the one of the machines on which measurements were made by sensors installed thereon.

* * * * *